3,060,044
PAPER COATING COMPOSITION
John D. Lohnas, Cumberland, Md., and Arne B. Carlson, Keyser, W. Va., assignors to West Virginia Pulp and Paper Company, New York, N.Y., a corporation of Delaware
Filed May 15, 1959, Ser. No. 813,524
5 Claims. (Cl. 106—171)

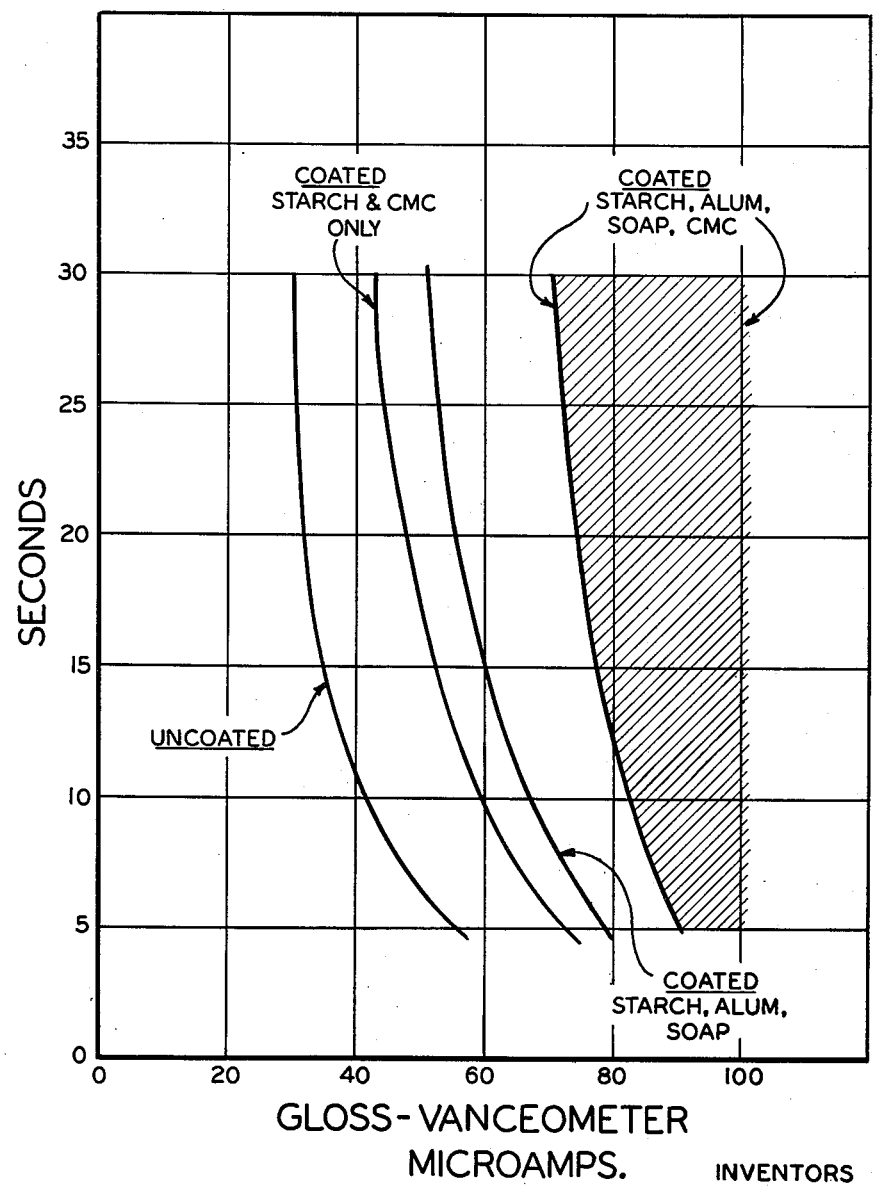

The present invention relates to coating compositions for paper and the like, especially those adapted to be used as surface sizings for paper, to methods of making same, and to the paper so coated. More particularly it relates to such coating compositions or sizings that constitute a barrier to wax or oil and hence are particularly useful when the sheet is to be wax or asphalt bonded to another sheet to form a laminate.

In the manufacture of various board material for boxes, it is common practice to employ a high grade one-side-coated sheet (known in the art as a C1S sheet) which is bonded to a second sheet or board of a less expensive type such as jute or chipboard. Because of their cheapness and qualities of affording resistance to transmission of water vapor, paraffin wax and asphalt are commonly recommended and used as the adhesive between the two plies. Frequently, however, the drawback is experienced that at high room temperatures, the wax or asphalt will soften appreciably and penetrate the C1S sheet. When used in packaging the latter commonly bears decorative printing and illustrations in keeping with modern practices, whereby such penetration or "bleed through" impairs the appearance of the package and spoils the decorative effect.

The art has therefore long sought an efficient and relatively inexpensive size coating to be applied to the back of the C1S or other sheet so that when the latter is wax- or asphalt-laminated to the backing sheet (chipboard or the like) it will cause the C1S sheet to withstand the penetration of such adhesive under circumstances normally encountered in the use of the finished laminate.

After much experimentation, we have discovered a coating composition satisfactorily answering the requirements as above set forth, and such invention will be best understood by reference to the following detailed description and example taken with the annexed drawing, which shows various curves illustrative of the coating compositions falling within the scope of our invention, as well as the effect which is had when certain ingredients of our composition are omitted.

In a preferred embodiment of our invention we employ a composition consisting essentially of modified starch, soap, papermaker's alum, and sodium carboxymethylcellulose (sodium cellulose glycolate) which for convenience will be referred to as CMC.

EXAMPLE 1

The following ingredients were taken in the proportions stated:

| | Parts by weight |
|---|---|
| Modified starch | 90 |
| Sodium carboxymethylcellulose—low viscosity | 4 |
| Soap flakes | 3½ |
| Papermaker's alum (hydrated aluminum sulfate) | 2½ |

In blending the above ingredients, 200 parts of cold water were added to a cooking vessel equipped with a stirrer, followed by addition of the modified starch with constant agitation, then the CMC was slowly added, followed by a solution in water of the soap flakes (10% solution), and finally a solution in water of the alum (10% solution), after which the temperature was brought to and held at 190° F. for a period of 10 minutes. The mixture upon dilution in water to a solution having 15% solids, was ready for use.

In the above example, the improved sizing composition had a pH of 4.2, and had a viscosity of 68 seconds at 105° F., as measured by the Dudley pipette of a water value of 35 seconds. It was applied at the size press on the paper machine to give a coating on the back side of the C1S paper of approximately 1 pound per ream (500 sheets, 25 x 38 inches).

In use, paper so coated, and having preferably a coating of mineral pigments on the opposite side (in other words, a so-called C1S paper), was laminated to 18 point chipboard using a wax containing 2% butyl rubber. A similar lamination was accomplished with the same chipboard using a standard wax containing no rubber. The laminating was done both with and without the use of chilled rolls. Furthermore, the C1S sheet containing the size coat as per Example 1 was asphalt laminated to chipboard of the same type as above mentioned, with entire success. The so laminated sheet was then tested for bleed resistance at elevated temperatures in accordance with TAPPI standard T475m-50 of July 1950, in which a sample of the paper to be tested was first placed between two pieces of wide paper and the "sandwich" so formed placed under a block of metal and maintained at a temperature between 150 to 190° F., and the G.E. brightness before and after, compared. The results so obtained were as follows:

TABLE 1

Asphalt Laminated Sample Aged at 170° F.

| Hours aged | G.E. Brightness | Asphalt Staining |
|---|---|---|
| 0 | 72.5 | none |
| 1 | 70.8 | none |
| 3 | 70.8 | none |
| 5 | 71.3 | none |
| 18 | 72.6 | none |

TABLE 2

Asphalt Laminated Sample Aged at 190° F.

| Hours Aged | G.E. Brightness | Asphalt Staining |
|---|---|---|
| 0 | 72.5 | none |
| 1 | 72.0 | none |
| 3 | 70.5 | none |
| 5 | 72.4 | none |
| 18 | 68.5 | none |

The amount of asphalt used in laminating was eight (8) pounds per 1000 square feet.

The papers so treated were tested for wax and asphalt barrier properties in the instrument known as the Vance-ometer. This instrument is described in an article in Paper Trade Journal, volume 123, #17, dated October 24, 1946, pages 209–11. Essentially the instrument provides means for holding a test sheet of paper upon which oil of standardized properties is dropped and spread out in a film by a rolling cylinder. Then a beam of light is directed upon the oiled surface and its reflection there from is measured by a photoelectric cell connected to a microammeter. As the oil film gradually disappears below the surface of the sheet, less light is reflected, and the reading of the microammeter is correspondingly less. Readings are taken every ten seconds up to 30 or more, and the readings plotted as seen in the figure of the drawing. A reading after 30 seconds of from 70 to 100 microamperes is considered satisfactory.

BASE SHEET

The paper sized as per Example 1 had the following properties prior to being sized, but it is understood that base sheets having considerable variation from the properties enumerated may be used with the improved sizing composition:

| | |
|---|---|
| Basis weight | 60 lbs. (25 x 38—500). |
| Gloss (B&L) | 65. |
| Smoothness (BEKK) | 1600. |
| Densometer | 10,000 secs. |
| Pick (wax) | 7. |
| Brightness (G.E.) | 78.5 |
| Mullen | 36. |
| Moisture | 5.2. |
| Vanceometer at 30 seconds | 30 microamperes. |

It is desriable that the paper be subjected to both the usual breaker stack and the machine calender during its manufacture, in order to reduce as much as possible its penetration by the sizing.

After application of the improved sizing composition according to the above example, the Vanceometer reading at 30 seconds rose to 80. In general, paper coated with the improved sizing composition will range from a Vanceometer reading of 70 to somewhat in excess of 100, the other properties remaining the same.

The improved composition may be applied at from 4 to 15% solids concentration, with the greatest effect being had with the highest concentration. The proportions given in the above example may be varied considerably, especially when different operating conditions are called for.

The improved coating composition may be applied to the paper in a manner similar to that used for other sizings the principal ingredient of which is starch. Preferably it is applied at the size press of the paper making machine, although tub sizing and calender sizing may be used where circumstances require it. If necessary or desirable, the sizing operation may be performed off the papermaking machine, or at the coater when this is an integral part of the papermaking machine, especially when it is desired to avail oneself of its value as a coating composition per se, i.e., apart from its sizing properties. Where the final sheet is to have a coating of mineral pigments, as for example, in order to improve the gloss, such coating will normally be applied to the wire side of the sheet, whereas the improved sizing composition of this invention will be applied to the felt side, preferably before the mineral pigment coating is applied.

NOTES ON INGREDIENTS USED IN FORMULATION

The modified starch used was prepared in known manner from corn starch. Its original molecular weight and viscosity were lowered in known manner by conventional treatment such as by enzymes, ethylene oxide, etc. Other starches may be used, such as tapioca and potato. Other methods of treatment to lower the viscosity or molecular weight, or both, of the starch used, will occur to those skilled in the art. The term "modified starch" as used in the specification and claims will be understood to refer to starches which have undergone such treatment, and such starch may also be referred to as reduced viscosity starch.

The CMC used is preferably of low viscosity, i.e., from 25–50 centipoises at 25° C., for a 2% solution, although a higher viscosity CMC may be used, giving the final coating a higher viscosity. Irrespective of the viscosity, CMC normally contains from 0.65 to 0.85 sodium carboxymethyl groups per anhydroglucose unit. In contrast to so-called low viscosity CMC, the viscosity of medium viscosity CMC in centipoises may range from 300 to 600 for a 2% solution at 25° C., and the viscosity of high viscosity CMC may range from 1300 to 2200 for a 1% solution, the other conditions remaining the same. The addition of CMC which has certain oil and wax resistant properties not possessed by starch, enhances the oil resistant properties of the sizing composition besides increasing the toughness of the finished coating. In place of CMC, methyl ether of cellulose and hydroxyethyl cellulose may be used in approximately the same amounts as the CMC. As showing the action of the CMC, Example 1 was repeated except that this ingredient was left out. The test data obtained were substantially the same except the Vanceometer reading was 50 microamperes at 30 seconds, instead of from 70 to 100 as obtained in Example 1, thus showing a greatly decreased ability to resist oil penetration.

It is found that the addition of polyethylene glycol (approximately 4000 molecular weight) to the composition, while not essential, is of advantage in that it serves as a release agent. It may be added to the mixture undergoing cooking in dry pellet form in an amount on the order of 0.25%.

A prime function of the soap used is as a leveler, i.e., to eliminate tracks or streaks in the film of coating on the paper. It forms a complex with the starch, CMC and alum.

The elimination of tracks as mentioned in the preceeding paragraph is also dependent upon the presence of alum. Thus when the pH of the liquid coating is as high as 5, streaking may be experienced in spite of the presence of soap. When, however, the pH is dropped to 4 by the presence of alum, the streaking does not materialize.

The use of modified starch, soap and papermaker's alum, is well-known in the manufacture of starch adhesives. Polyethylene glycol has also been proposed as a constituent of coating compositions for paper. However, so far as we are aware, the conjoint use of these ingredients with CMC in substantially the proportions called for, with or without polyethylene glycol, has not been proposed, and the wax barrier properties of a paper so coated, so far as we are aware, has not been obtained using prior starch based coating compositions.

Our improved coating composition may also find application in papers adapted as food wraps in which the said composition constitutes the sole grease barrier, or, if desired, the paper so coated may receive upon the coating surface a layer of paraffin or other wax, or of asphalt, or a composition in which either wax or asphalt is a principal ingredient, so that the product has both grease and moisture resistant properties.

By soap is meant soluble soap, e.g., sodium and ammonium oleates or stearates and others commonly used in paper coating formulations.

Various changes may be made in the example specifically set forth without departing from the spirit of our invention or the scope of the appended claims.

We claim:

1. A composition of matter for coating paper and adapted to serve as a sizing agent to protect against bleed-through by wax and asphalt containing adhesives, said composition by weight consisting essentially of reduce viscosity starch approximately 90%, sodium carboxymethylcellulose 4%, soluble soap 3½%, and papermaker's alum 2½%, said composition being applicable to the paper to be coated when diluted in water to a solids concentration of 4–15% and at a pH below 7.

2. A coated paper the base sheet of which has a Vanceometer value of approximately 30 microamperes at 30 seconds and a coating thereover, said coating by weight consisting essentially of reduced viscosity starch approximately 90% sodium carboxymethyl-cellulose 4%, soluble soap 3½%, and papermaker's alum 2½%, said paper so coated having a Vanceometer value at 30 seconds of from 70 to 100.

3. A coated paper according to claim 2 having a second coating over said coating first mentioned, consisting principally of wax.

4. A coated paper according to claim 2 having a second coating over said coating first mentioned, consisting principally of asphalt.

5. The composition according to claim 1, containing approximately 0.25% polyethylene glycol as a release agent.

References Cited in the file of this patent

UNITED STATES PATENTS

| | | |
|---|---|---|
| 2,235,798 | Collings et al. | Mar. 18, 1941 |
| 2,280,699 | Grant et al. | Apr. 21, 1942 |
| 2,308,692 | Freeman et al. | Jan. 19, 1943 |
| 2,317,696 | Rich | Apr. 27, 1943 |
| 2,811,462 | Cramer et al. | Oct. 29, 1957 |